United States Patent
Guizilini et al.

(10) Patent No.: US 11,625,846 B2
(45) Date of Patent: Apr. 11, 2023

(54) SYSTEMS AND METHODS FOR TRAINING A MACHINE-LEARNING-BASED MONOCULAR DEPTH ESTIMATOR

(71) Applicant: Toyota Research Institute, Inc., Los Altos, CA (US)

(72) Inventors: Vitor Guizilini, Santa Clara, CA (US); Rares A. Ambrus, San Francisco, CA (US); Adrien David Gaidon, Mountain View, CA (US); Jie Li, Los Altos, CA (US)

(73) Assignee: Toyota Research institute, Inc., Los Altos, CA (US)

( * ) Notice: Subject to any disclaimer, the term of this patent is extended or adjusted under 35 U.S.C. 154(b) by 204 days.

(21) Appl. No.: 17/212,325

(22) Filed: Mar. 25, 2021

(65) Prior Publication Data

US 2022/0309695 A1 Sep. 29, 2022

(51) Int. Cl.
| | | |
|---|---|---|
| *G06K 9/00* | (2022.01) | |
| *G06T 7/571* | (2017.01) | |
| *G06T 15/20* | (2011.01) | |
| *G06T 15/40* | (2011.01) | |
| *G06T 3/00* | (2006.01) | |

(52) U.S. Cl.
CPC .............. *G06T 7/571* (2017.01); *G06T 3/005* (2013.01); *G06T 15/20* (2013.01); *G06T 15/405* (2013.01); *G06T 2207/10024* (2013.01); *G06T 2207/10028* (2013.01); *G06T 2207/20081* (2013.01); *G06T 2207/20084* (2013.01)

(58) Field of Classification Search
CPC ......... G06T 7/571; G06T 3/005; G06T 15/20; G06T 15/405; G06T 2207/10024; G06T 2207/10028; G06T 2207/20081; G06T 2207/20084
USPC .......................................................... 382/157
See application file for complete search history.

(56) References Cited

U.S. PATENT DOCUMENTS 10,119,808 B2 11/2018 Venkataraman et al.
2020/0151512 A1* 5/2020 Corral-Soto ......... G06K 9/6262

OTHER PUBLICATIONS

Saleh et al., "Domain Adaptation for Vehicle Detection from Bird's Eye View LiDAR Point Cloud Data," IEEE Xplore, 2019, found at https://openaccess.thecvf.com/content_ICCVW_2019/papers/TASK-CV/Saleh_Domain_Adaptation_for_Vehicle_Detection_from_Birds_Eye_View_LiDAR_ICCVW_2019_paper.pdf.

(Continued)

*Primary Examiner* — Jonathan S Lee (74) *Attorney, Agent, or Firm* — Christopher G Darrow; Darrow Mustafa PC (57) ABSTRACT

Systems and methods described herein relate to training a machine-learning-based monocular depth estimator. One embodiment selects a virtual image in a virtual dataset, the virtual dataset including a plurality of computer-generated virtual images; generates, from the virtual image in accordance with virtual-camera intrinsics, a point cloud in three-dimensional space based on ground-truth depth information associated with the virtual image; reprojects the point cloud back to two-dimensional image space in accordance with real-world camera intrinsics to generate a transformed virtual image; and trains the machine-learning-based monocular depth estimator, at least in part, using the transformed virtual image.

20 Claims, 4 Drawing Sheets

(56) References Cited

OTHER PUBLICATIONS

Yan, et al "Learning domain-invariant subspace using domain features and independence maximization." IEEE transactions on cybernetics 48, No. 1 (2017): 288-299, available at: arXiv:1603.04535v2 [cs.CV] Jun. 22, 2017.

Ganin, et al. "Unsupervised domain adaptation by backpropagation." In International conference on machine learning, pp. 1180-1189. PMLR, 2015.

Tzeng, et al "Deep domain confusion: Maximizing for domain invariance.", found at: arXiv:1412.3474v1 [cs.CV] Dec. 10, 2014.

Long, et al., "Learning transferable features with deep adaptation networks." In International conference on machine learning, pp. 97-105. PMLR, 2015.

Dijk, et al., "How do neural networks see depth in single images?." In Proceedings of the IEEE International Conference on Computer Vision, pp. 2183-2191. 2019.

Zhang, et al., "Adversarial Attacks on Monocular Depth Estimation." found at: arXiv:2003.10315v1 [cs.CV] Mar. 23, 2020.

Facil, et al., "CAM-Convs: camera-aware multi-scale convolutions for single-view depth." In Proceedings of the IEEE conference on computer vision and pattern recognition, pp. 11826-11835. 2019.

Antequera, et al., "Mapillary Planet-Scale Depth Dataset." date unknown, available at http://www.ecva.net/papers/eccv_2020/papers_ECCV/papers/123470579.pdf.

Guo, et al., "Learning monocular depth by distilling cross-domain stereo networks." In Proceedings of the European Conference on Computer Vision (ECCV), pp. 484-500. 2018.

Jaramillo et al., "6-DoF Pose Localization in 3D Point-Cloud Dense Maps Using a Monocular Camera," Proceedings of the IEEE International Conference on Robotics and Biomimetics (ROBIO), Shenzhen, China, Dec. 2013, pp. 1747-1752.

Vasiljevic et al., "Neural Ray Surfaces for Self-Supervised Learning of Depth and Ego-motion", found at: arXiv:2008.06630V1 [cs.CV] Aug. 15, 2020.

* cited by examiner

SYSTEMS AND METHODS FOR TRAINING A MACHINE-LEARNING-BASED MONOCULAR DEPTH ESTIMATOR

TECHNICAL FIELD

The subject matter described herein relates in general to robots and, more specifically, to systems and methods for training a machine-learning-based monocular depth estimator.

BACKGROUND

In a variety of robotics applications, including autonomous vehicles and Advanced Driver-Assistance Systems (ADASs), the robot estimates depth (distance or range) to support navigation, obstacle avoidance, and other decision-making tasks. This is sometimes accomplished using three-dimensional sensors such as Light Detection and Ranging (LIDAR) sensors, but depth can also be estimated from a single two-dimensional image. Such an approach is sometimes referred to as "monocular depth estimation." In some implementations, a machine-learning-based monocular depth estimation system is trained using both virtual (e.g., computer-generated) image datasets and real datasets. One challenge that arises in such an implementation is that the camera intrinsics (characteristics such as focal length, principal points, distortion properties, etc.) of the virtual camera model that produced a virtual dataset may differ from the camera intrinsics of the real-world camera that produced a real dataset, which can reduce the accuracy of the depth estimates produced by the trained monocular depth estimation system.

SUMMARY

An example of a system for training a machine-learning-based monocular depth estimator is presented herein. The system comprises one or more processors and a memory communicably coupled to the one or more processors. The memory stores a dataset transformation module including instructions that when executed by the one or more processors cause the one or more processors to select a virtual image in a virtual dataset, the virtual dataset including a plurality of computer-generated virtual images. The dataset transformation module also includes instructions that cause the one or more processors to generate, from the virtual image in accordance with virtual-camera intrinsics, a point cloud in three-dimensional space based on ground-truth depth information associated with the virtual image. The dataset transformation module also includes instructions that cause the one or more processors to reproject the point cloud back to two-dimensional image space in accordance with real-world camera intrinsics to generate a transformed virtual image. The memory also stores a training module including instructions that when executed by the one or more processors cause the one or more processors to train the machine-learning-based monocular depth estimator, at least in part, using the transformed virtual image.

Another embodiment is a non-transitory computer-readable medium for training a machine-learning-based monocular depth estimator and storing instructions that when executed by one or more processors cause the one or more processors to select a virtual image in a virtual dataset, the virtual dataset including a plurality of computer-generated virtual images. The instructions also cause the one or more processors to generate, from the virtual image in accordance with virtual-camera intrinsics, a point cloud in three-dimensional space based on ground-truth depth information associated with the virtual image. The instructions also cause the one or more processors to reproject the point cloud back to two-dimensional image space in accordance with real-world camera intrinsics to generate a transformed virtual image. The instructions also cause the one or more processors to train the machine-learning-based monocular depth estimator, at least in part, using the transformed virtual image.

Another embodiment is a method of training a machine-learning-based monocular depth estimator, the method comprising selecting a virtual image in a virtual dataset, the virtual dataset including a plurality of computer-generated virtual images. The method also includes generating, from the virtual image in accordance with virtual-camera intrinsics, a point cloud in three-dimensional space based on ground-truth depth information associated with the virtual image. The method also includes reprojecting the point cloud back to two-dimensional image space in accordance with real-world camera intrinsics to generate a transformed virtual image. The method also includes training the machine-learning-based monocular depth estimator, at least in part, using the transformed virtual image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of systems and methods for training a machine-learning-based monocular depth estimator are disclosed herein. To overcome the problem of different camera intrinsics (characteristics such as focal length, principal points, distortion properties, etc.) between a virtual dataset and a real dataset, these various embodiments transform the images in the virtual dataset so that the resulting camera intrinsics of the transformed virtual images match those of the real-world camera that produced the real dataset. The machine-learning-based monocular depth estimator can then be trained using the transformed virtual dataset and, in some embodiments, the real dataset. Since the camera intrinsics are consistent between the transformed virtual dataset and the real dataset, the accuracy of the trained monocular depth estimator (e.g., a system including one or more neural networks) can be improved relative to an implementation in which the original virtual dataset and the real dataset are used to train the monocular depth estimator. As those skilled in the art are aware, one significant advantage of training a monocular depth estimation network, at least in part, using a virtual dataset is that ground-truth (actual, accurate) depth information is available for virtual images.

More specifically, in various embodiments, a system for training a machine-learning-based monocular depth estimator selects a virtual image in a virtual dataset that includes a plurality of computer-generated (synthetic) virtual images. The system generates, from the virtual image in accordance with virtual-camera intrinsics, a point cloud in three-dimensional (3D) space based on ground-truth depth information (e.g., per-pixel depth values) associated with the virtual image. The system then reprojects the point cloud back to two-dimensional (2D) image space in accordance with the camera intrinsics of a real-world camera to generate a transformed virtual image. The system can then train the machine-learning-based monocular depth estimator, at least in part, using the transformed virtual image. In some embodiments, all the images in the virtual dataset are transformed in accordance with the camera intrinsics of a real-world camera that produced a real dataset, and both the transformed virtual dataset and the real dataset are used to train the machine-learning-based monocular depth estimator.

Figure 1:
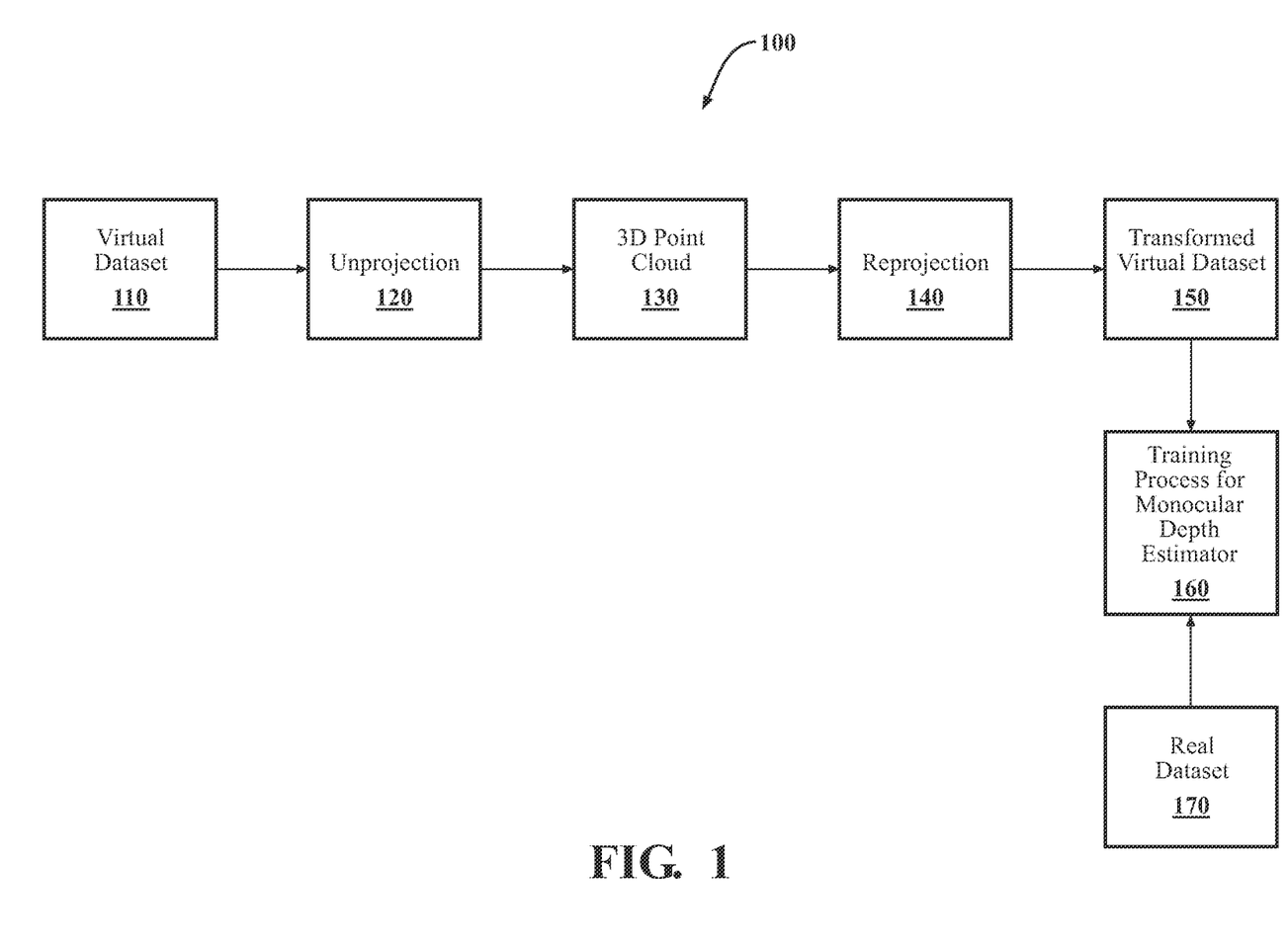
FIG. 1 illustrates a processing flow of a machine-learning-based monocular depth estimation training system, in accordance with an illustrative embodiment of the invention.

Referring to FIG. 1, a processing flow 100 of a machine-learning-based monocular depth estimation training system is illustrated, in accordance with an illustrative embodiment of the invention. Processing flow 100 includes a virtual dataset 110 including one or more virtual (computer-generated, synthetic) images (e.g., Red-Green-Blue (RGB) images). In this embodiment, during the rendering process that produces the 2D virtual images, ground-truth depth information for each pixel in a given virtual image is obtained from the z-buffer and stored. The virtual dataset 110 is input to an unprojection operation 120 that generates, for each virtual image in the virtual dataset 110, a 3D point cloud 130 based on the ground-truth depth information associated with that virtual image and in accordance with the intrinsics of the virtual-camera model by which the virtual dataset 110 was rendered. In some embodiments, this virtual-camera model is a pinhole camera model. Each 3D point cloud 130 is input to a reprojection operation 140. Reprojection operation 140 reprojects each 3D point cloud 130 back to 2D image space in accordance with the camera intrinsics of a real-world camera (a camera that produced a real dataset 170) to produce a transformed virtual image in a transformed virtual dataset 150.

As shown in FIG. 1, once the virtual dataset 110 has been transformed into the transformed virtual dataset 150 by way of the foregoing process, transformed virtual dataset 150 can be input to a training process 160 for a machine-learning-based monocular depth estimator. As mentioned above, in some embodiments, images from the real dataset 170 can also be input to the training process 160. The images in real dataset 170 are generated by a real-world camera that photographs real-world scenes, and the real-world camera has associated camera intrinsics. Thus, the virtual images in the transformed virtual dataset 150 have camera intrinsics that match those of the real-world camera that produced real dataset 170. This consistency in the camera intrinsics between the transformed virtual dataset 150 and the real dataset 170 improves the training of the monocular depth estimator, enabling higher-accuracy depth estimates from the resulting trained monocular depth estimator than would otherwise be possible without the processing flow 100 just described.

Figure 2:
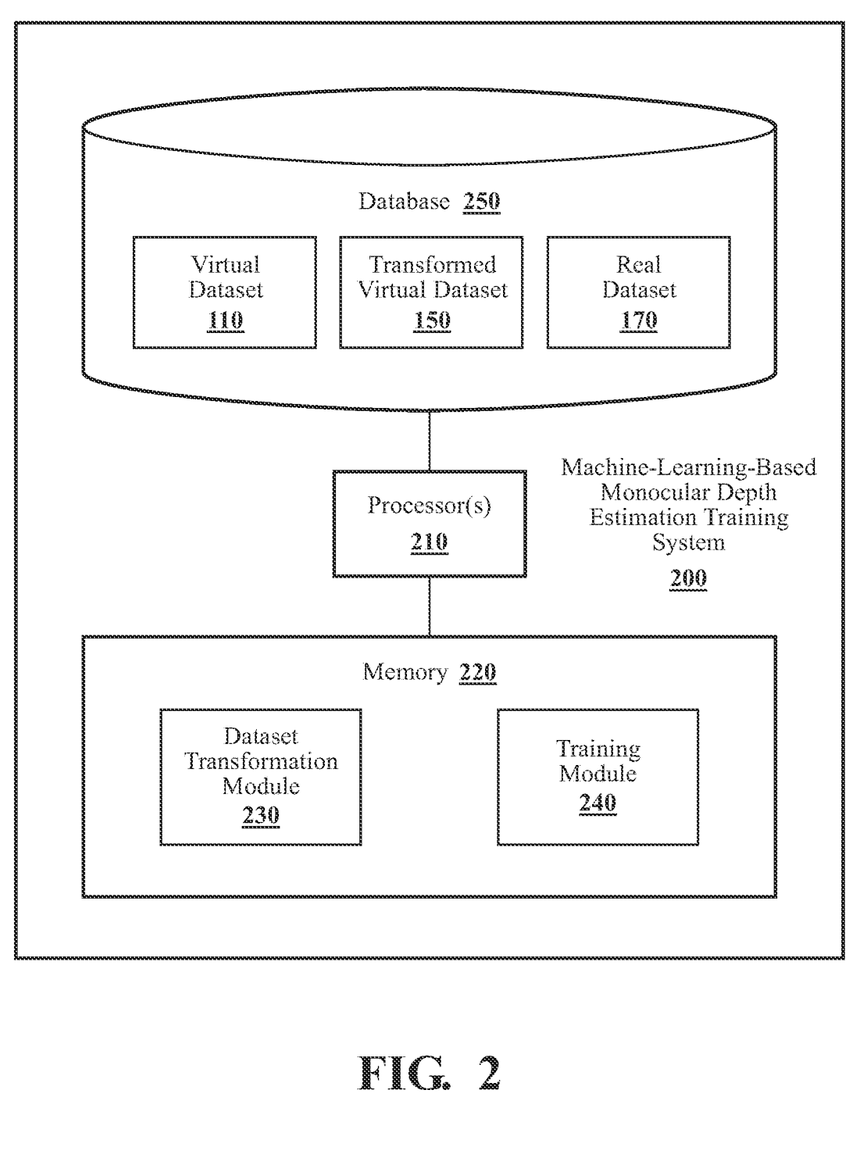
FIG. 2 is a block diagram of a machine-learning-based monocular depth estimation training system, in accordance with an illustrative embodiment of the invention.

With reference to FIG. 2, one embodiment of a machine-learning-based monocular depth estimation training system 200 (hereinafter "training system 200") is illustrated. The training system 200 is shown as including one or more processors 210. Training system 200 also includes a memory 220 communicably coupled to the one or more processors 210. The memory 220 stores a dataset transformation module 230 and a training module 240. The memory 220 is a random-access memory (RAM), read-only memory (ROM), a hard-disk drive, a flash memory, or other suitable memory for storing the modules 230 and 240. The modules 230 and 240 are, for example, computer-readable instructions that when executed by the one or more processors 210, cause the one or more processors 210 to perform the various functions disclosed herein.

In connection with its control functions, training system 200 can stores various kinds of data in a database 250. For example, in the embodiment shown in FIG. 2, training system 200 stores, in database 250, one or more virtual datasets 110, one or more transformed virtual datasets 150, and one or more real datasets 170. Database 250 can also store other kinds of data such as the intermediate results of calculations, model parameters, etc. (not shown in FIG. 2).

Dataset transformation module 230 generally includes instructions that when executed by the one or more processors 210 cause the one or more processors 210 to select a virtual image in a virtual dataset 110. As explained above, the virtual dataset 110 includes a plurality of computer-generated virtual images. Dataset transformation module 230 also includes instructions that when executed by the one or more processors 210 cause the one or more processors 210 to generate, from the virtual image in accordance with virtual-camera intrinsics, a 3D point cloud based on ground-truth depth information associated with the virtual image. Dataset transformation module 230 also includes instructions that when executed by the one or more processors 210 cause the one or more processors 210 to reproject the 3D point cloud back to 2D image space in accordance with real-world camera intrinsics to generate a transformed virtual image (part of transformed virtual dataset 150).

In some embodiments, the virtual images in virtual dataset 110 are Red-Green-Blue (RGB) images. How a 3D point cloud can be generated from a virtual image in virtual dataset 110 in accordance with virtual-camera intrinsics and subsequently reprojected back to 2D image space in accordance with real-world camera intrinsics is explained further below and illustrated in FIGS. 3A and 3B. In the description that follows, "unprojecting" or "lifting" refers to mapping a 2D image point (pixel) to 3D space, and "projecting" refers to mapping a point in a 3D point cloud to 2D image space (i.e., to the transformed virtual image based on the real-world camera intrinsics).

Figure 3A:
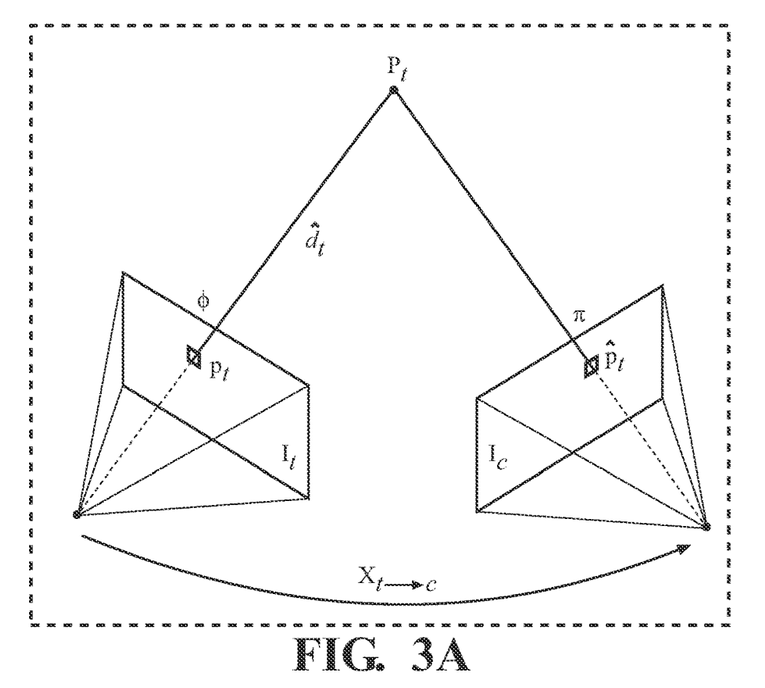
FIG. 3A illustrates one embodiment of a model for a pinhole camera.

FIG. 3A illustrates one embodiment of a model for a pinhole camera. More specifically, FIG. 3A illustrates lifting (unprojecting) $\phi(p, d)=P$ and projecting $\pi(P)=p$ for a single pixel $p_j$ considering target image $I_t$ and context image $I_c$. For a pinhole camera model, the equations for unprojection and projection can be written in closed form, respectively, as $\phi(p, d) = dK^{-1}p$ and $$\pi(P) = \frac{1}{P_z} KP,$$

where K is the intrinsics matrix associated with the pinhole camera model (the "virtual-camera intrinsics" discussed above).

Figure 3B:
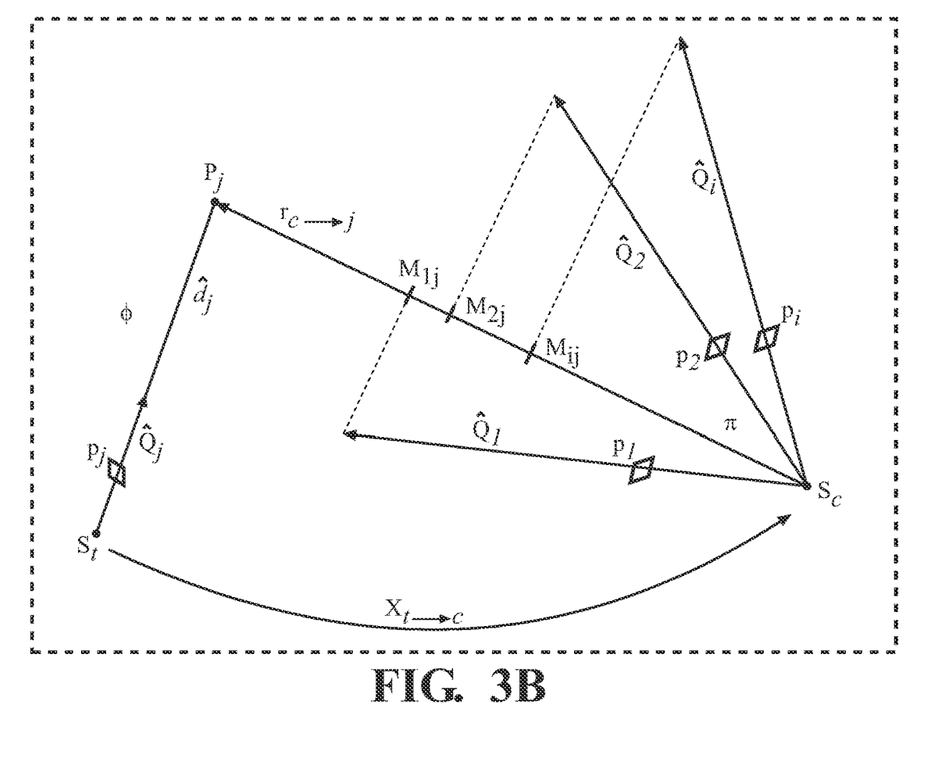
FIG. 3B illustrates one embodiment of a model for a camera having an arbitrary type.

FIG. 3B illustrates one embodiment of a model for a camera having an arbitrary type. In FIG. 3B, straight arrows represent unitary ray surface vectors Q(p), which may not be drawn to scale to facilitate visualization. Additionally, as illustrated in FIG. 3B, $p_1$ is associated to $p_j$.

To further define the notation applied in relation to FIG. 3B, for each pixel $p=[u, v]^T$, a camera offset/center is represented by S(u, v) as a 3D point and a unitary ray surface vector $Q(u, v) \in \mathbb{R}^3$, with D(u, v) representing scene depth along a ray. Additionally, the camera is the same for all points. Dataset transformation module 230 produces a ray surface estimate $f_r: I \rightarrow Q$ by way of a decoder in the depth network (not shown in FIG. 3B) that predicts $\hat{Q}=f_r(I)$. Accordingly, dataset transformation module 230 implements the lifting (unprojecting) operation according to equation (1):

$$P(u,v)=S(u,v)+\hat{D}(u,v)\hat{Q}(u,v) \qquad (1)$$

As noted in equation (1), dataset transformation module 230 scales a predicted ray vector $\hat{Q}(u, v)$ from the ray surface by a predicted depth $\hat{D}(u, v)$ from a depth map and further offsets this value by the camera offset/center S(u, v), which is common to all pixels p. In one embodiment, dataset transformation module 230 assumes that the camera center coincides with the origin of the reference coordinate system and, thus, sets $S(u, v)=[0, 0, 0]^T \forall (u, v)$.

Lifting (unprojection) operation $\mathcal{F}_t = \{P_j\}_{j=1}^{HW}$ produces pixels from $I_t$ as 3D points. To project the 3D points, dataset transformation module 230, in one embodiment, searches for each 3D point $P_j$ to find a corresponding pixel $p_i \in I_c$ with ray surface vector $\hat{Q}_i = \hat{Q}_c(p_i)$ that most closely matches the direction of $P_j$ to the camera center $S_c$. This direction is indicated as $r_{c \rightarrow j} = P_j - S_c$. Thus, dataset transformation module 230 searches for $p^*_i$ such that:

$$p^*_i = \arg\max_{p_i \in I_c} \langle \hat{Q}_c(p_i), r_{c \rightarrow j} \rangle \qquad (2)$$

To resolve this point from equation (2), in some embodiments, dataset transformation module 230 may further include instructions to implement the argmax function as a softmax function. For example, to project 3D points $\mathcal{F}_t$ onto context image $I_c$, dataset transformation module 230 finds, for each $P_j \in \mathcal{F}_t$, a corresponding pixel $p_i \in I_c$ with ray surface $\hat{Q}_i$ closest to the direction $r_{c \rightarrow j} = P_j - S_c$. Accordingly, dataset transformation module 230 calculates, in some embodiments, the dot product of each direction $r_{c \rightarrow j}$ with each ray vector $\hat{Q}_i$ to obtain a $(H \times W)^2$ tensor M where each coefficient $M_{ij} = \langle \hat{Q}_i, r_{c \rightarrow j} \rangle = M(p_i, P_j)$ represents a similarity between $\hat{Q}_i$ and $r_{c \rightarrow j}$. Accordingly, the camera model provides for:

$$i^* = \arg\max_i M(p_i, P_j) \qquad (3)$$

To make this operation differentiable, dataset transformation module 230, in some embodiments, substitutes a softmax with temperature $\tau$ for the argmax function to obtain the following new tensor $\tilde{M}$ define as:

$$\tilde{M}(p_i, P_j) = \frac{\exp(M(p_i, P_j)/\tau)}{(\Sigma_i \exp(M(p_i, P_j)/\tau))} \qquad (4)$$

Dataset transformation module 230 further anneals the temperature over a defined time so that the tensor becomes approximately one/hot for each pixel. Dataset transformation module 230 may acquire the 2D-3D association for projection by multiplying with a vector of pixel indices. In this way, dataset transformation module 230 can implement projection in a fully differentiable manner.

Furthermore, because rays at each pixel are independent and, thus, can point in any given direction, dataset transformation module 230, in some embodiments, implements searching for the point as part of the projecting operation using a patch-based search that avoids searching over the entire context image $I_c$. That is, dataset transformation module 230 may restrict the search involved in projecting the 3D points to a small h×w grid in the context image $I_c$ surrounding the (u, v) coordinates of the target pixel $p_t$. Dataset transformation module 230 is capable of limiting the search space to a patch/grid about the target pixel since, in general, the motion of the source camera is small enough to produce correct associations within the patch. Dataset transformation module 230 may implement further aspects to reduce memory requirements and improve performance, such as performing the search at half resolution and then up-sampling the results to produce a pixel-wise estimate via, for example, interpolation.

In some embodiments, dataset transformation module 230 includes further instructions that when executed by the one or more processors 210 cause the one or more processors 210 to repeat selecting a virtual image in the virtual dataset 110, generating a point cloud 130 in 3D space, and reprojecting the 3D point cloud 130 back to two-dimensional image space for each of the remaining computer-generated virtual images in the plurality of computer-generated virtual images to produce a transformed virtual dataset 150 including a corresponding plurality of transformed virtual images.

Training module 240 generally includes instructions that when executed by the one or more processors 210 cause the one or more processors 210 to train the machine-learning-based monocular depth estimator, at least in part, using the transformed virtual image. The particulars of the machine-learning-based monocular depth estimator vary, depending on the particular embodiment. In some embodiments, the monocular depth estimator includes one or more deep neural networks (DNNs). For example, in some embodiments, the monocular depth estimator includes a generative adversarial network (GAN) that includes stages or layers that perform convolutional operations. The monocular depth estimator can be trained in a supervised manner using the ground-truth depth information available in the transformed virtual dataset 150. In some embodiments, that ground-truth depth information includes a depth value for each pixel in a given virtual image or corresponding transformed virtual image. Such depth information, in some embodiments, the ground-truth depth information is stored in a depth map, a grayscale image in which the intensity of a given pixel represents the distance from the pixel in question to the camera.

In some embodiments, training module 240 includes further instructions that when executed by the one or more processors 210 cause the one or more processors 210 to train the machine-learning-based monocular depth estimator using both the transformed virtual dataset 150 and a real dataset 170, wherein, as discussed above, the real dataset 170 includes a plurality of real images produced by a real-world camera having associated real-world camera intrinsics. This is shown in FIG. 1.

Figure 4:
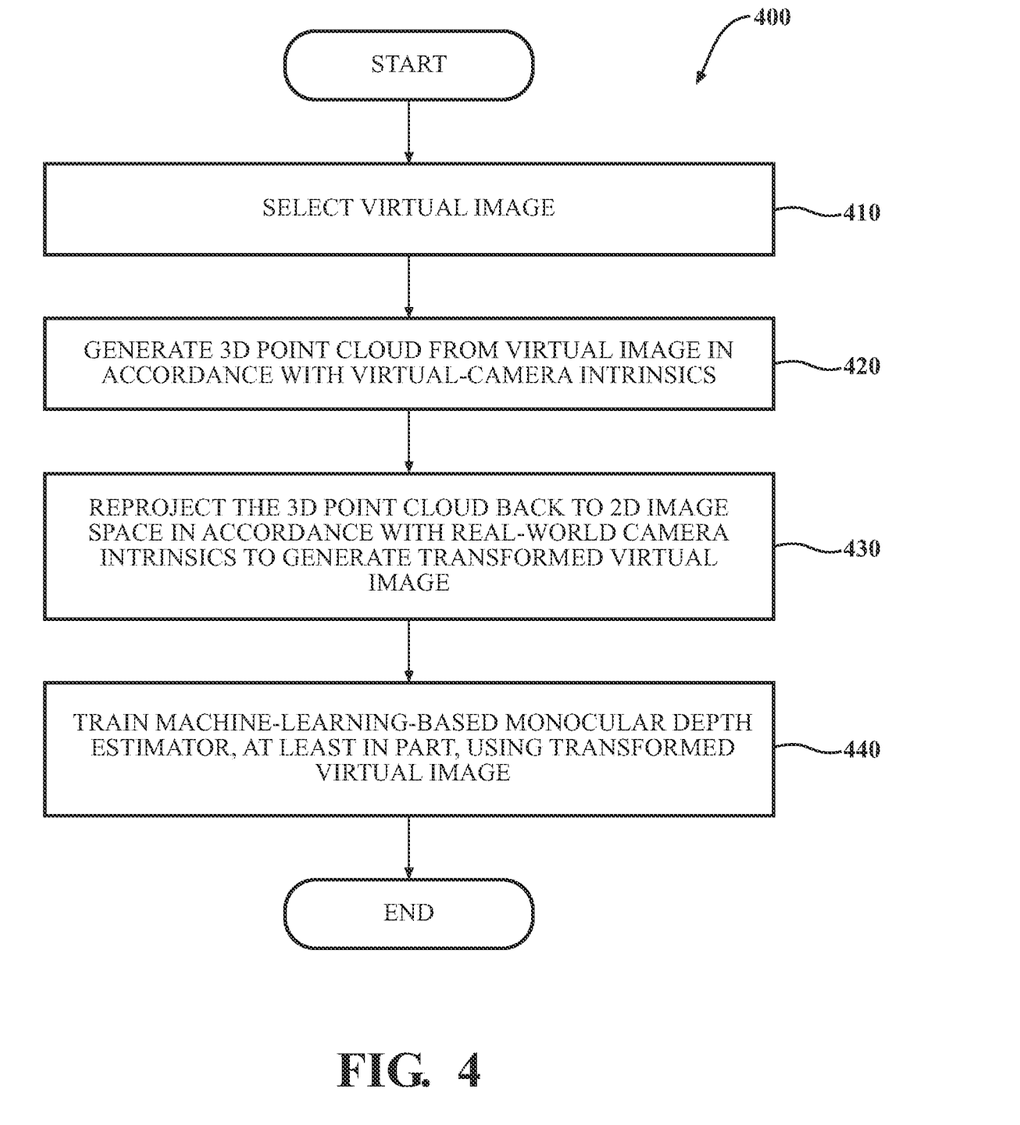
FIG. 4 is a flowchart of a method of training a machine-learning-based monocular depth estimator, in accordance with an illustrative embodiment of the invention.

FIG. 4 is a flowchart of a method of training a machine-learning-based monocular depth estimator, in accordance with an illustrative embodiment of the invention. Method 400 will be discussed from the perspective of training system 200 in FIG. 2. While method 400 is discussed in combination with training system 200, it should be appreciated that method 400 is not limited to being implemented within training system 200, but training system 200 is instead one example of a system that may implement method 400.

At block 410, dataset transformation module 230 selects a virtual image in a virtual dataset 110, the virtual dataset 110 including a plurality of computer-generated virtual images. As discussed above, in one embodiment, during the rendering process that produces the 2D virtual images, ground-truth depth information for each pixel in a given virtual image is obtained from the z-buffer and stored for later use.

At block 420, dataset transformation module 230 generates, from the virtual image in accordance with virtual-camera intrinsics, a 3D point cloud based on ground-truth depth information associated with the virtual image. As discussed above, in some embodiments, the ground-truth depth information is stored in a depth map, a grayscale image in which the intensity of a given pixel represents the distance from the pixel in question to the camera.

At block 430, dataset transformation module 230 reprojects the 3D point cloud back to 2D image space in accordance with real-world camera intrinsics to generate a transformed virtual image that is part of a transformed virtual dataset 150. As discussed above, the transformed virtual image being generated using the real-world camera intrinsics enables a machine-learning-based monocular depth estimator to be trained using both the transformed virtual dataset 150 and a real dataset 170 created by the real-world camera having the real-world camera intrinsics without the decrease in performance/accuracy that would otherwise result, if the transformation of the virtual dataset 110 were not performed prior to execution of the training process 160 (see FIG. 1).

At block 440, training module 240 trains the machine-learning-based monocular depth estimator, at least in part, using the transformed virtual image. As discussed above, in some embodiments, all of the virtual images in virtual dataset 110 are transformed as described above, and the machine-learning-based monocular depth estimator is trained using both a transformed virtual dataset 150 and a real dataset 170 (see FIG. 1).

The various embodiments of training system 200 described herein can be employed in support of a variety of applications in which depth is estimated from 2D image data. Some applications include, without limitation, autonomous vehicles, semi-autonomous vehicles, Advanced Driver-Assistance Systems (ADASs), indoor robotics applications (e.g., service or medical robots), search and rescue robots, and aerial drones.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for training a machine-learning-based monocular depth estimator, the system comprising:
   one or more processors; and
   a memory communicably coupled to the one or more processors and storing:
   a dataset transformation module including instructions that when executed by the one or more processors cause the one or more processors to:
      select a virtual image in a virtual dataset, the virtual dataset including a plurality of computer-generated virtual images;
      generate, from the virtual image in accordance with virtual-camera intrinsics, a point cloud in three-dimensional space based on ground-truth depth information associated with the virtual image; and
      reproject the point cloud back to two-dimensional image space in accordance with real-world camera intrinsics to generate a transformed virtual image; and
   a training module including instructions that when executed by the one or more processors cause the one or more processors to train the machine-learning-based monocular depth estimator, at least in part, using the transformed virtual image.

2. The system of claim 1, wherein the virtual-camera intrinsics include a first focal length and first principal points of a virtual camera model and the real-world camera intrinsics include a second focal length and second principal points of a real-world camera.

3. The system of claim 1, wherein the machine-learning-based monocular depth estimator includes at least one neural network.

4. The system of claim 1, wherein the ground-truth depth information associated with the virtual image is obtained from a z-buffer during a rendering process that produces the virtual image.

5. The system of claim 1, wherein the dataset transformation module includes further instructions that when executed by the one or more processors cause the one or more processors to repeat selecting a virtual image in the virtual dataset, generating a point cloud in three-dimensional space, and reprojecting the point cloud back to two-dimensional image space for each of the remaining computer-generated virtual images in the plurality of computer-generated virtual images to produce a transformed virtual dataset including a corresponding plurality of transformed virtual images and the training module includes further instructions that when executed by the one or more processors cause the one or more processors to train the machine-learning-based monocular depth estimator using the transformed virtual dataset and a real dataset, wherein the real dataset includes a plurality of real images produced by a real-world camera having the real-world camera intrinsics.

6. The system of claim 1, wherein the virtual image is a Red-Green-Blue (RGB) image.

7. The system of claim 1, wherein the ground-truth depth information associated with the virtual image includes a depth value for each pixel in the virtual image.

8. A non-transitory computer-readable medium for training a machine-learning-based monocular depth estimator and storing instructions that when executed by one or more processors cause the one or more processors to:
   select a virtual image in a virtual dataset, the virtual dataset including a plurality of computer-generated virtual images;
   generate, from the virtual image in accordance with virtual-camera intrinsics, a point cloud in three-dimensional space based on ground-truth depth information associated with the virtual image;
   reproject the point cloud back to two-dimensional image space in accordance with real-world camera intrinsics to generate a transformed virtual image; and
   train the machine-learning-based monocular depth estimator, at least in part, using the transformed virtual image.

9. The non-transitory computer-readable medium of claim 8, wherein the virtual-camera intrinsics include a first focal length and first principal points of a virtual camera model and the real-world camera intrinsics include a second focal length and second principal points of a real-world camera.

10. The non-transitory computer-readable medium of claim 8, wherein the machine-learning-based monocular depth estimator includes at least one neural network.

11. The non-transitory computer-readable medium of claim 8, wherein the ground-truth depth information associated with the virtual image is obtained from a z-buffer during a rendering process that produces the virtual image.

12. The non-transitory computer-readable medium of claim 8, wherein the instructions include further instructions that when executed by one or more processors cause the one or more processors to:
- repeat selecting a virtual image in the virtual dataset, generating a point cloud in three-dimensional space, and reprojecting the point cloud back to two-dimensional image space for each of the remaining computer-generated virtual images in the plurality of computer-generated virtual images to produce a transformed virtual dataset including a corresponding plurality of transformed virtual images; and
- train the machine-learning-based monocular depth estimator using the transformed virtual dataset and a real dataset, wherein the real dataset includes a plurality of real images produced by a real-world camera having the real-world camera intrinsics.

13. The non-transitory computer-readable medium of claim 8, wherein the ground-truth depth information associated with the virtual image includes a depth value for each pixel in the virtual image.

14. A method of training a machine-learning-based monocular depth estimator, the method comprising:
- selecting a virtual image in a virtual dataset, the virtual dataset including a plurality of computer-generated virtual images;
- generating, from the virtual image in accordance with virtual-camera intrinsics, a point cloud in three-dimensional space based on ground-truth depth information associated with the virtual image;
- reprojecting the point cloud back to two-dimensional image space in accordance with real-world camera intrinsics to generate a transformed virtual image; and
- training the machine-learning-based monocular depth estimator, at least in part, using the transformed virtual image.

15. The method of claim 14, wherein the virtual-camera intrinsics include a first focal length and first principal points of a virtual camera model and the real-world camera intrinsics include a second focal length and second principal points of a real-world camera.

16. The method of claim 14, wherein the machine-learning-based monocular depth estimator includes at least one neural network.

17. The method of claim 14, wherein the ground-truth depth information associated with the virtual image is obtained from a z-buffer during a rendering process that produces the virtual image.

18. The method of claim 14, further comprising:
- repeating the selecting, generating, and reprojecting for each of the remaining computer-generated virtual images in the plurality of computer-generated virtual images to produce a transformed virtual dataset including a corresponding plurality of transformed virtual images; and
- training the machine-learning-based monocular depth estimator using the transformed virtual dataset and a real dataset, wherein the real dataset includes a plurality of real images produced by a real-world camera having the real-world camera intrinsics.

19. The method of claim 14, wherein the virtual image is a Red-Green-Blue (RGB) image.

20. The method of claim 14, wherein the ground-truth depth information associated with the virtual image includes a depth value for each pixel in the virtual image.

* * * * *